(12) United States Patent
Musto

(10) Patent No.: US 11,299,234 B1
(45) Date of Patent: Apr. 12, 2022

(54) MOTORCYCLE FRAME SUSPENSION SYSTEM

(71) Applicant: Terence M. Musto, Glenmont, NY (US)

(72) Inventor: Terence M. Musto, Glenmont, NY (US)

( * ) Notice: Subject to any disclaimer, the term of this patent is extended or adjusted under 35 U.S.C. 154(b) by 711 days.

(21) Appl. No.: 16/047,938

(22) Filed: Jul. 27, 2018

Related U.S. Application Data

(60) Provisional application No. 62/539,305, filed on Jul. 31, 2017.

(51) Int. Cl.
*B62K 25/28* (2006.01)
*B62K 11/02* (2006.01)

(52) U.S. Cl.
CPC ............ *B62K 25/283* (2013.01); *B62K 11/02* (2013.01)

(58) Field of Classification Search
CPC ...... B62K 25/02; B62K 25/283; B62K 11/02; B62M 9/16
See application file for complete search history.

(56) References Cited

U.S. PATENT DOCUMENTS

| | | | | |
|---|---|---|---|---|
| 1,056,492 A * | 3/1913 | Bilsten | ................. | B62K 25/286 280/284 |
| 2,486,430 A | 11/1949 | Moore | | |
| 4,393,954 A | 7/1983 | Soucy | | |
| 4,540,062 A * | 9/1985 | Kashiwai | ............... | B62K 25/04 180/227 |
| 4,582,343 A | 4/1986 | Waugh | | |
| 4,634,139 A * | 1/1987 | Watanabe | ................ | B62M 9/16 280/288 |
| 4,679,811 A | 7/1987 | Shuler | | |
| 4,782,908 A * | 11/1988 | Trema | .................. | B62K 25/283 180/226 |
| 4,967,867 A * | 11/1990 | Fuller | ...................... | B62J 13/00 180/219 |
| 5,240,087 A * | 8/1993 | Parker | ...................... | B62M 9/16 180/227 |
| 5,409,248 A | 4/1995 | Williams | | |
| 5,487,443 A | 1/1996 | Thurm | | |
| 6,112,840 A * | 9/2000 | Forbes | ................... | B62K 3/002 180/191 |
| 6,131,934 A | 10/2000 | Sinclair | | |
| 6,406,048 B1 | 6/2002 | Castellano | | |
| 6,481,523 B1 * | 11/2002 | Noro | .................... | B62K 25/283 180/227 |
| 6,505,847 B1 * | 1/2003 | Greene | .................. | B62K 25/20 280/284 |
| 7,137,468 B2 * | 11/2006 | Siddle | .................. | B62K 25/283 180/227 |
| 7,147,235 B2 * | 12/2006 | West | ..................... | A63C 17/013 280/87.042 |
| 7,287,772 B2 * | 10/2007 | James | .................... | B62K 25/02 180/227 |

(Continued)

*Primary Examiner* — Kevin Hurley
*Assistant Examiner* — Michael R Stabley
(74) *Attorney, Agent, or Firm* — Lee Palmateer Law Office LLC; Lee Palmateer

(57) ABSTRACT

A motorcycle suspension system comprising an axle block on each side of the motorcycle, each axle block for receiving one side of a rear wheel axle, and each axle block rotatably connected to a motorcycle frame member with a bearing. Each axle block may be rotatably connected to the rear wheel axle with a bearing.

16 Claims, 11 Drawing Sheets

(56) References Cited

U.S. PATENT DOCUMENTS

| | | | |
|---|---|---|---|
| 7,374,191 B1 | 5/2008 | Tseng | |
| 7,380,808 B2 * | 6/2008 | D'Aluisio | B62K 21/02 |
| | | | 280/275 |
| 7,392,874 B2 | 7/2008 | Koistra | |
| 7,520,361 B2 * | 4/2009 | Anzai | B62M 9/16 |
| | | | 180/227 |
| 7,546,894 B1 | 6/2009 | Glenn | |
| 7,559,396 B2 | 7/2009 | Schwindt | |
| 7,677,347 B2 | 3/2010 | Brawn | |
| 7,762,369 B2 * | 7/2010 | Riesterer | F16B 37/14 |
| | | | 180/219 |
| 7,837,213 B2 * | 11/2010 | Colegrove | B62K 25/04 |
| | | | 280/284 |
| 8,075,010 B2 * | 12/2011 | Talavasek | B62K 25/30 |
| | | | 280/288 |
| 8,162,344 B2 * | 4/2012 | Hoogendoorn | B60B 27/04 |
| | | | 280/284 |
| 8,740,239 B2 * | 6/2014 | Lumpkin | B62K 19/30 |
| | | | 280/288 |
| 8,827,024 B1 * | 9/2014 | Sumi | B62M 9/16 |
| | | | 180/227 |
| 9,150,274 B1 * | 10/2015 | Musto | B62K 25/283 |
| 9,227,690 B1 * | 1/2016 | Becker | B62K 25/02 |
| 9,308,961 B2 * | 4/2016 | McDonald | B62K 25/02 |
| 10,131,401 B2 * | 11/2018 | Nolin | B62K 25/02 |
| 2005/0212351 A1 * | 9/2005 | McKay | B60B 7/20 |
| | | | 301/110.5 |
| 2010/0194182 A1 * | 8/2010 | Katz | B62K 25/30 |
| | | | 301/109 |
| 2016/0244124 A1 * | 8/2016 | Hon | B62K 25/283 |

\* cited by examiner

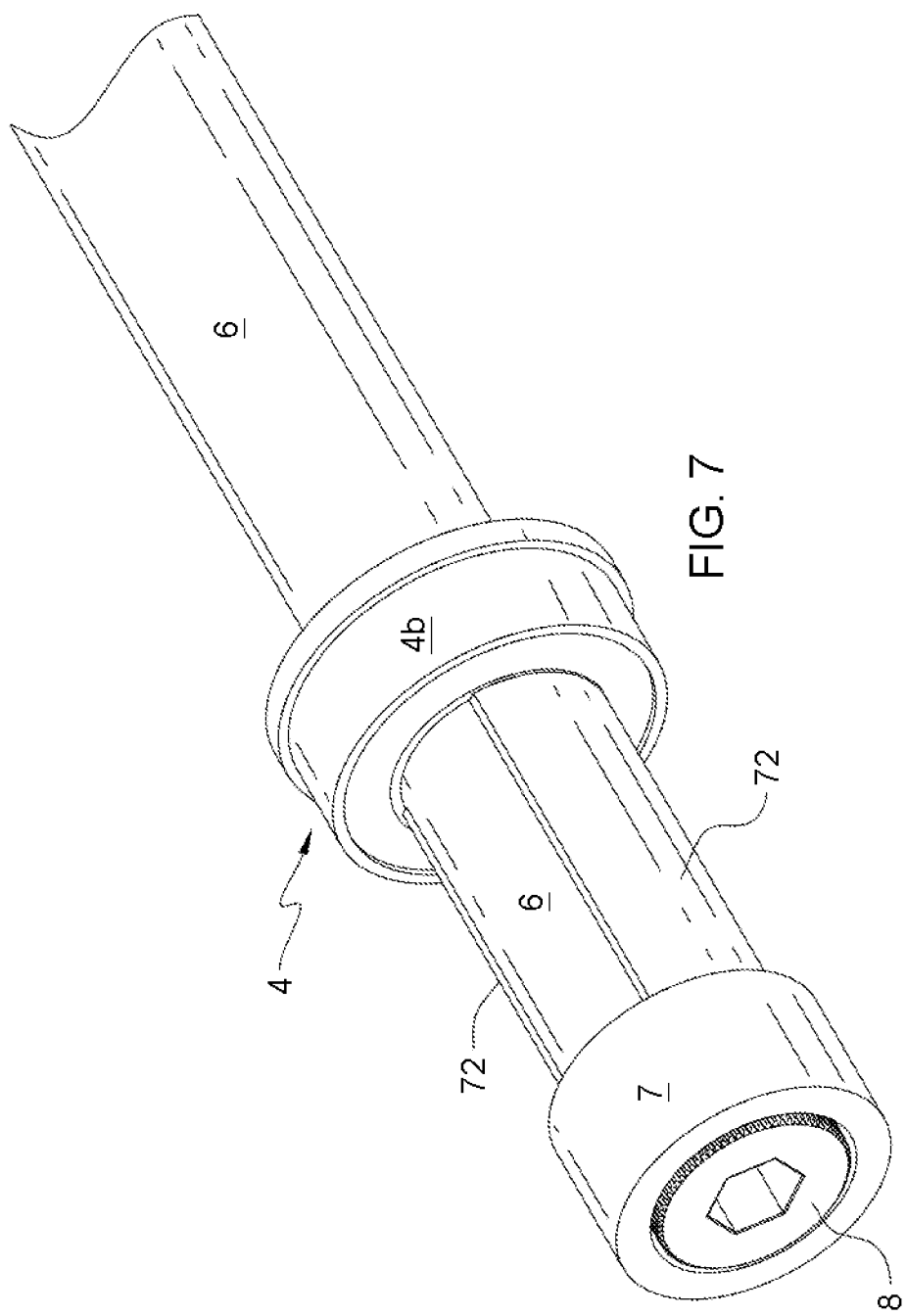

MOTORCYCLE FRAME SUSPENSION SYSTEM

CROSS-REFERENCE TO RELATED APPLICATIONS

This application claims the benefit under 35 U.S.C. § 119(e) of U.S. Provisional Patent Application Ser. No. 62/539,305 filed on Jul. 31, 2017, which is hereby incorporated herein by reference in its entirety.

TECHNICAL FIELD

The present invention relates to an improved motorcycle frame suspension system.

BACKGROUND OF THE INVENTION

Rigid motorcycle frames offer simplicity in design, classic lines, a clean look, and ample room for the motor and other components. An example of a rigid frame is sketched in FIG. 11, which shows tubular frame members 61a and 62a connected to left side axle plate 63 and frame members 61b and 62b connected to right side axle plate 63. The axle plates provide structure to which the motorcycle rear wheel is attached, including an aperture for receiving one side of the rear wheel axle.

As the name implies, rigid motorcycle frames provide relatively little attenuation of shock loads, such as those experienced while riding over objects or surface imperfections. Other types of motorcycle frames provide suspension systems for shock attenuation, such as Softail® style and swing-arm style frames. Softail® style and swing-arm style suspension systems are less attractive than rigid frames, occupy substantially more space in the frame compartment, and require significant maintenance. The swing-arm and Softail® suspension systems, like in virtually every motorcycle rear-wheel suspension system are pivoting systems in which rear frame members have a pivoting connection to the main frame that allows them to pivot to absorb shock.

U.S. Pat. No. 9,150,274 (hereinafter "the '274 Patent"), dated Oct. 6, 2015, issued to Terence M. Musto discloses an improved motorcycle frame that provides the aesthetic and practical advantages of a rigid frame, while at the same time providing a suspension system for a smoother and more comfortable ride. The '274 Patent discloses, among other things, an improved motorcycle frame comprising shock absorbers disposed in line with rear frame members. Said in-line shocks are each connected at one end to a frame member and at the other end to an axle block that is connected to the rear wheel axle.

The present invention provides an improved axle block configured to provide rotatable connection with in-line shocks and with the rear wheel axle. The axle block of the present invention may connect directly to frame members that do not have in-line shocks and may be connected to in-line shocks that are connected to frame members.

SUMMARY OF THE INVENTION

In a first aspect, the present invention provides an axle block comprising: a body configured to receive a motorcycle rear wheel axle in a first axial alignment; a recess in the body configured to receive a bearing; and a through hole in the recess aligned parallel to said first axial alignment.

In a second aspect, the present invention provides an axle block comprising: a body comprising: a first aperture configured to receive a horizontally disposed axle; and a second aperture configured to receive a horizontally disposed bearing.

In a third aspect, the present invention provides an axle block comprising: a body having an aperture for receiving a motorcycle wheel axle; a bearing connected to the body so as to provide a rotatable connectability with a motorcycle frame.

In a fourth aspect, the present invention provides an axle block comprising: a body; a bearing having an inner race and an outer race; said outer race connected to the body, and said inner race configured to receive a rear wheel axle.

In a fifth aspect, the present invention provides a motorcycle suspension system comprising: an axle block configured to receive a wheel axle; a bearing connected to the axle block; a frame member connected to said bearing.

In a sixth aspect, the present invention provides a motorcycle suspension system comprising: an axle block; a wheel axle connected to the axle block with a first connection; a frame member rotatably connected to the axle block with a second connection.

BRIEF DESCRIPTION OF THE DRAWINGS

The subject matter that is regarded as the invention is particularly pointed out and distinctly claimed in the concluding portion of the specification. The invention, however, may be best understood by reference to the following detailed description of various embodiments and the accompanying drawings in which:

FIG. 7 is a perspective view of an assembly of an axle cap, axle bolt, main bearing and rear wheel axle of the present invention, with the axle block omitted to expose otherwise hidden features;

DETAILED DESCRIPTION OF THE INVENTION

For purposes of this disclosure, unless otherwise specified or it is otherwise apparent from the description, directional references will be with respect to an upright motorcycle and an axle block orientation as assembled with an upright cycle. The left and right side of the motorcycle are from the perspective of a forward facing person such as a rider. The terms "outboard" and "inboard" are relative to a vertical plane through the longitudinal centerline of an upright motorcycle, i.e., "outboard" is further out from the center than "inboard."

Figure 1:
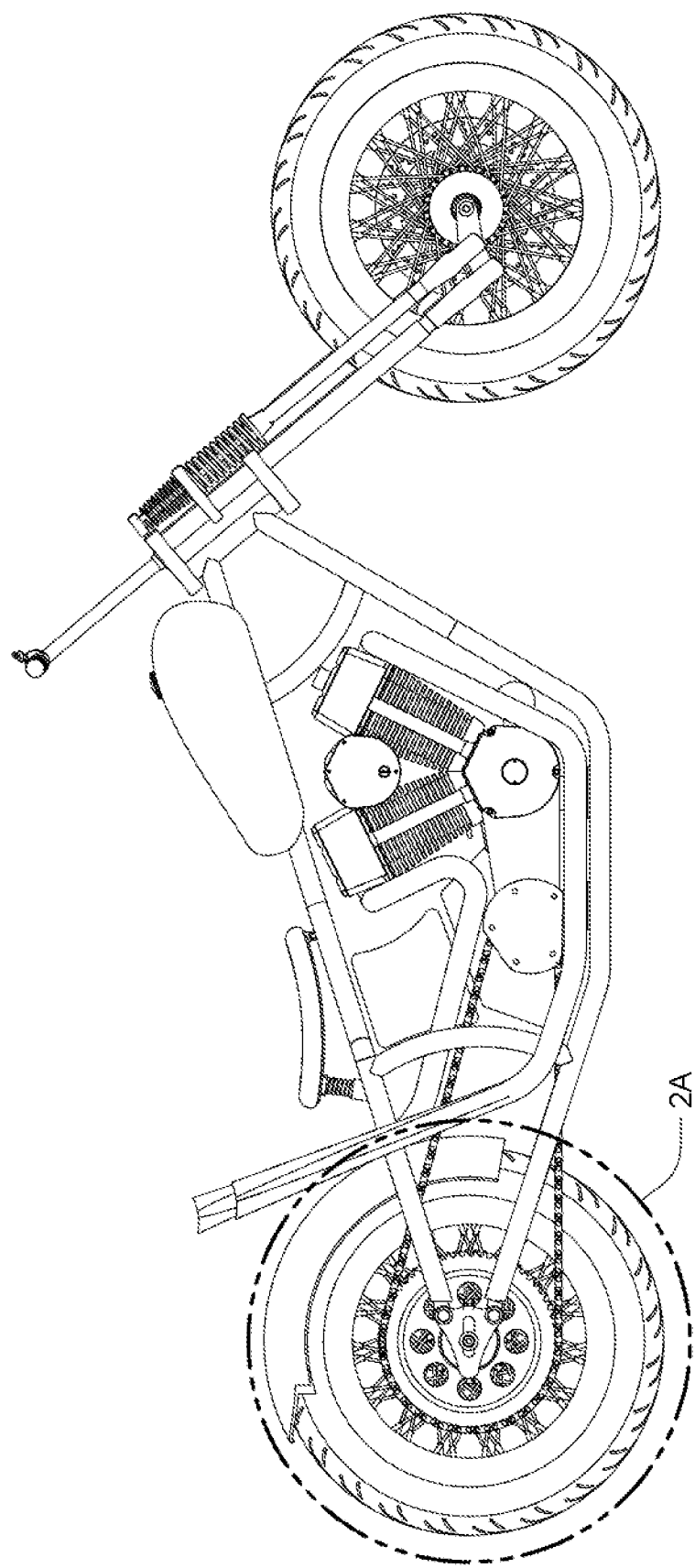
FIG. 1 is a side view of a motorcycle comprising an axle block of present invention.
Figure 2:
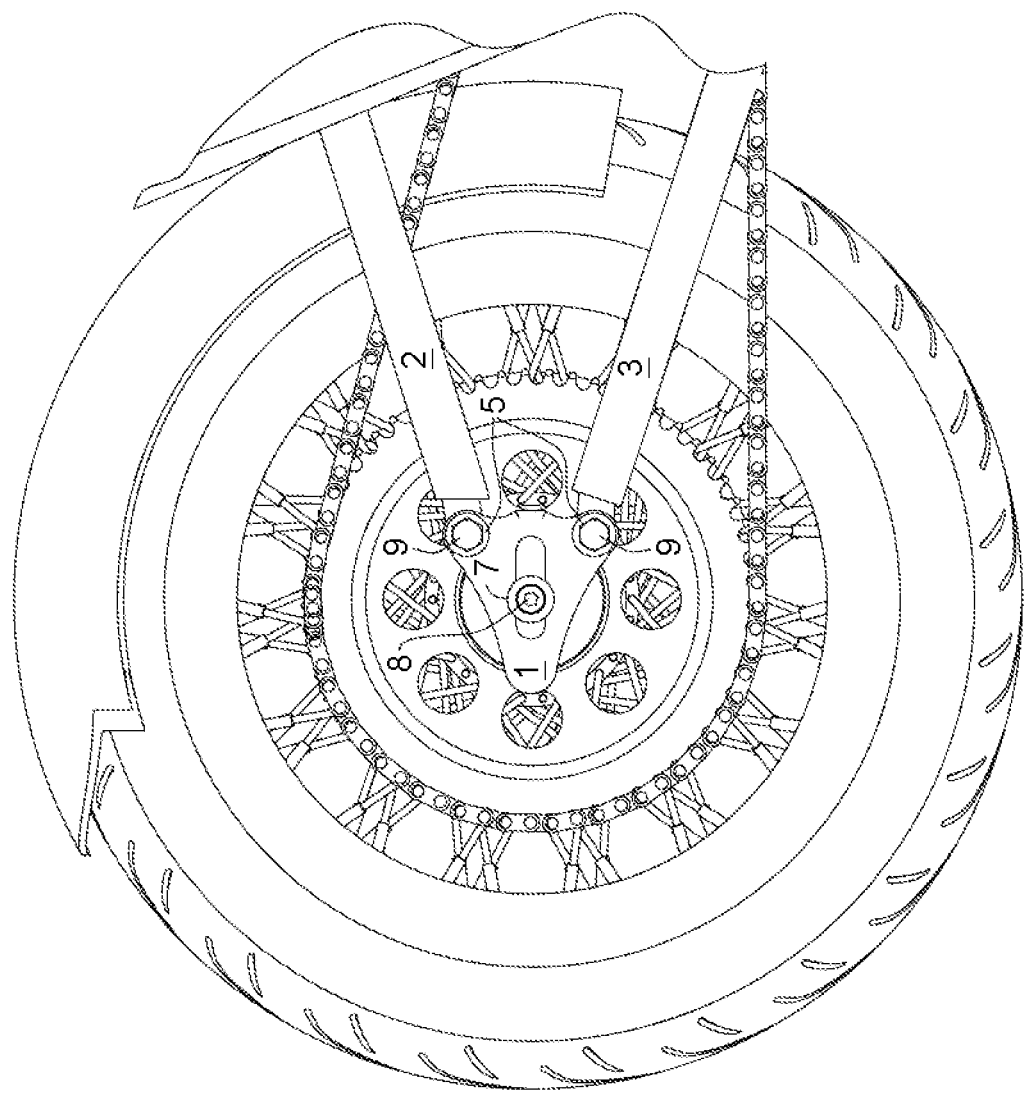
FIG. 2 is a close-up view of the rear of the motorcycle of FIG. 1.
Figure 10:
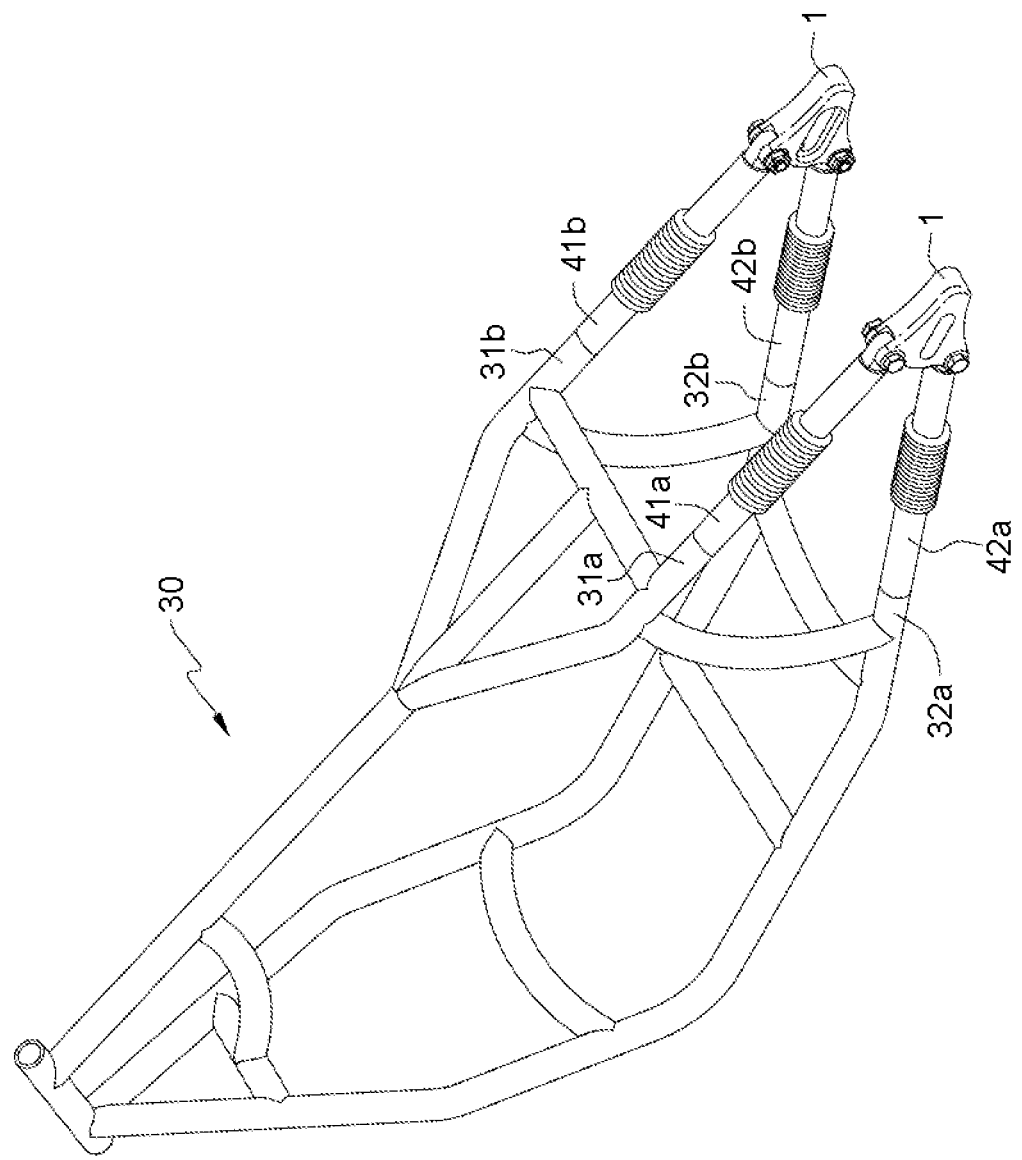
FIG. 10 is a perspective view of an improved frame of the present invention.
Figure 11:
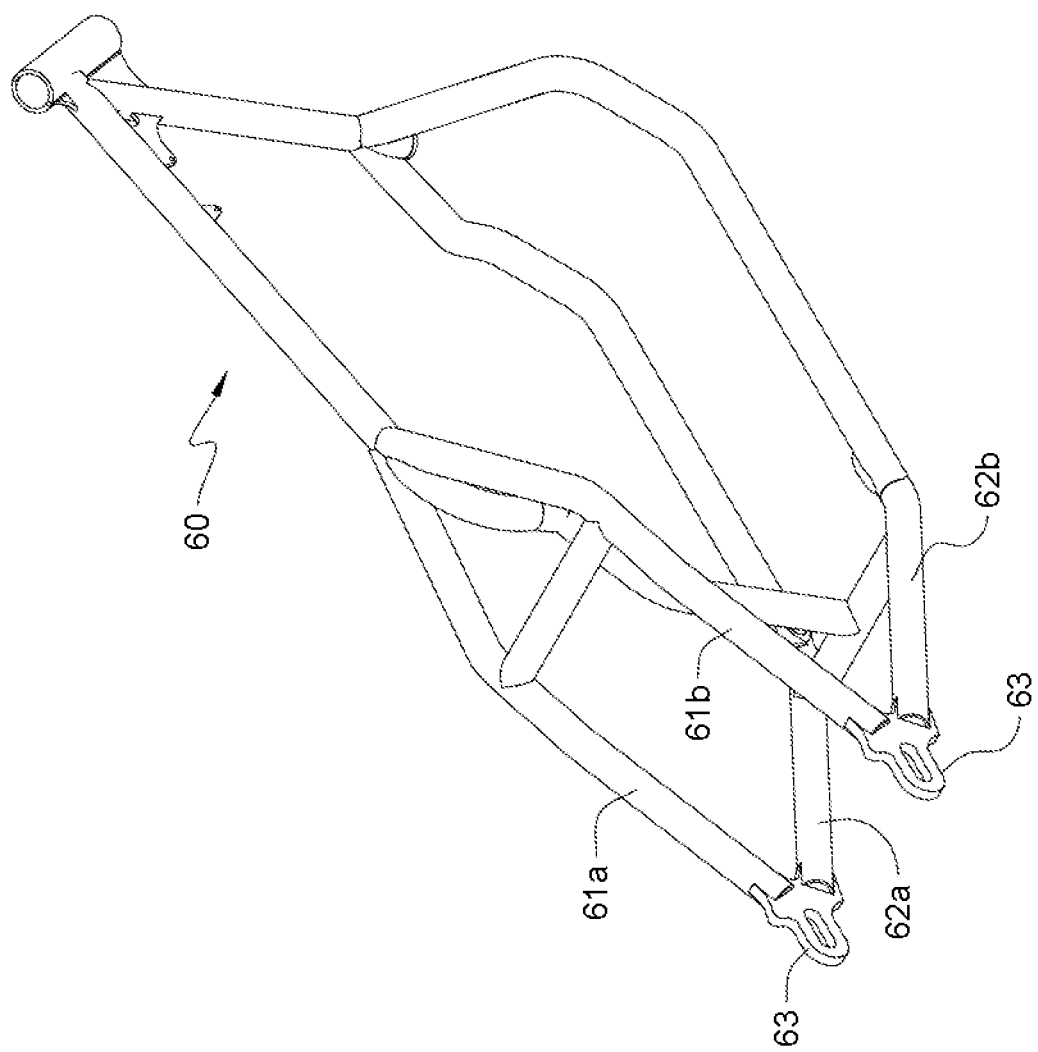
FIG. 11 is a prior art rigid frame.

For suspension system components that are disposed between or that connect a frame member and rear wheel axle, "frame side" or "frame end" refer to the side or end that is nearer the frame member, and "axle side" or axle end" refer to the side or end that is nearer the axle. For example, an elongated frame member or absorber may have an axle side proximal to the axle block and a frame side distal to the axle block and proximal to other frame members. Frame members (or shock absorbers) connected directly to an axle block of the present invention may be referred to as rear-terminal frame members (e.g., members 2 or 3 in FIG. 2 and members 41b or 42b in FIG. 10) in that they are the members rearmost in the frame between the front and rear axles.

Axle blocks of the present invention may connect frame members (which frame members may comprise in-line shock absorbers) to the rear wheel axle and may comprise a rear wheel aperture for receiving one end of the rear wheel axle. Said aperture may be elongated horizontally to allow variable positioning of the axle within aperture in the forward-and-back direction. Rear wheel apertures may be described in terms of length (in the direction of elongation), width and depth.

The term "absorber" refers to a device, member or mechanism that employs known vehicle suspension system technologies or concepts to attenuate shock loads and oscillations of vehicle components. In cycle suspension systems, absorbers provide enhanced attenuation capabilities compared to typical structural frame members, such as tubes. Examples of typical absorber technologies used in shocks and struts of present day commercially available vehicle suspension systems include, without limitation, springs, pneumatic pistons, hydraulic pistons, gas-over hydraulic pistons, and combinations thereof such as coil-over shocks.

With reference to FIGS. 1, 2, 9 and 10, one embodiment of the improved axle block 1 of the present invention may be attached to the axle side motorcycle frame members 2 and 3 (or in-line shock absorbers 41a, 42a, 41b and 42b, as the case may be) at the rear of the motorcycle frame and to the axle 6 of the motorcycle rear wheel. In a preferred embodiment, axle block 1 is attached to members (or absorbers) with bolts 9 and nuts 10. The axle block is disposed between the frame members (or absorbers) and the axle, and is more proximate to the axle than are the frame members (or absorbers). The axle block does not comprise frame members or absorbers. Thus, the axle block provides both an axle connection and frame member connection (or absorber connection, as the case may be) on the axle side of the frame member (or absorber). In a preferred embodiment, the axle block provides a pivoting connection with frame member (or absorbers) on the axle side of frame members (or absorbers).

With reference to FIGS. 2, 3A, 3B, 7, A, 8B and 9, in a preferred embodiment, main bearing 4 may be disposed in aperture 14 of axle block 1, rear wheel axle 6 may be disposed through main bearing inner race 4a and in axle block aperture 13, axle cap 7 may be disposed in aperture 13 and over the end of axle 6, and axle bolt 8 may the threaded into the tapped hole in the end of the axle so as to securely fasten the axle cap to the end of the axle.

With reference to FIGS. 3A, 7, 8 and 9, the inboard end 76 of the axle cap abuts the outboard side of the inner race 4a of main bearing 4. Once assembled with the rear wheel, the inboard side of inner race 4a of the main bearing 4 abuts the outboard side of a rear wheel spacer (not shown), and thus inner race 4a is held in position against end 76 of the axle cap.

With reference to FIGS. 4A, 4B, 8 and 9, each fork 72 of the axle cap has upper horizontal surface 73 and lower horizontal surface 74, and aperture 13 of the axle block is defined by surface 15. The width of forks 72, i.e., the distance between surfaces 73 and 74, may have a clearance fit, precise fit, or interference fit with the width of aperture 13 of the axle block. With a clearance fit, the axle block may have freedom to rotate a limited amount about the axis of the axle. After a limited amount of rotation, axle cap surfaces 73 and 74 may contact sides 15 of aperture 13 to prevent further rotation. Over said limited range of freedom of rotation, the left and right axle blocks are not mechanically bound to one another by the axle in the angular direction, and they may independently rotate about the axle axis with respect to one another. Such limited independence of rotation has significant effects on transfer of torsional forces (i.e., torsional about the axle axis) from one axle block to the other, and therefore may affect shock attenuation characteristics of the suspension system of the present invention.

In alternate embodiments, a cap having no clearance with the side walls of the aperture may be provided in which surfaces 73 and 74 remain in contact with the horizontal sections of axle block surface 15 so that there is no freedom of angular rotation. In such embodiments, angular rotation of one axle block to another would be limited by the amount of elasticity in the system, i.e., by the amount of elastic deflection that may be experienced by the axle, axle caps and axle blocks and under torsional stress (i.e., torsional about the axle axis).

Figure 3B:
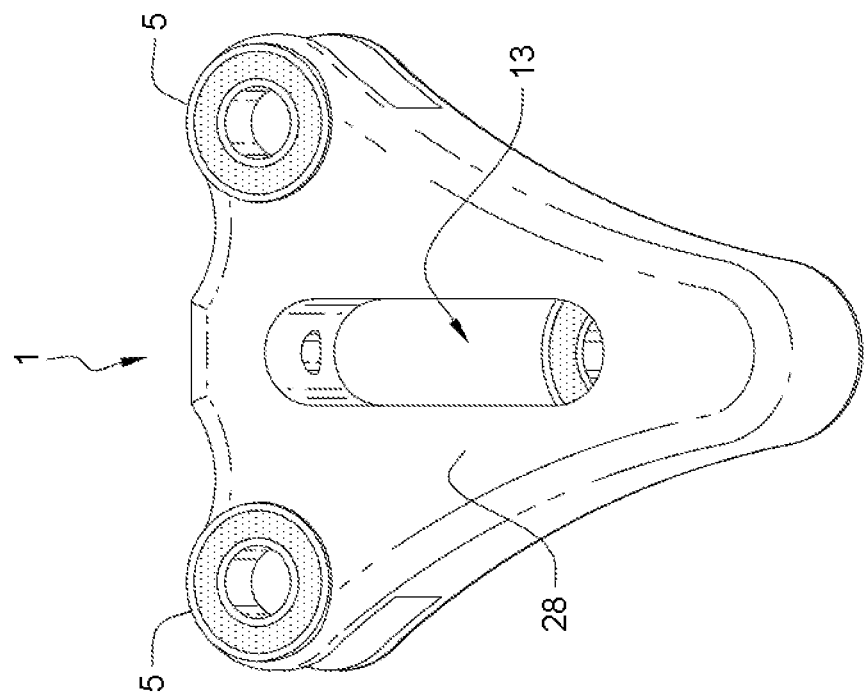
FIG. 3B is a perspective view of the outboard side of axle block and bearing assembly of FIG. 3A.
Figure 3A:
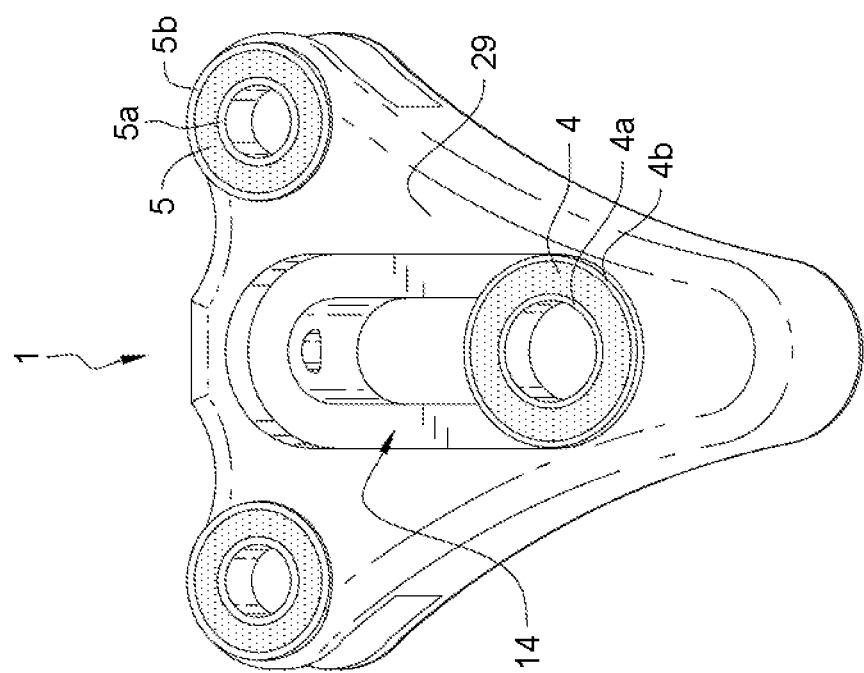
FIG. 3A is a perspective view of the inboard side of an improved axle block and bearing assembly of the present invention.
Figure 4B:
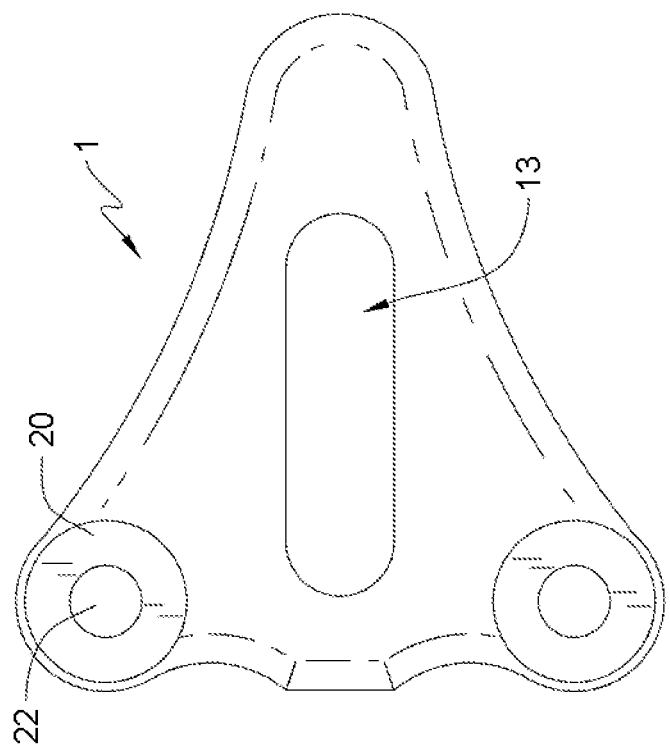
FIG. 4B is a side view of the outboard side of the axle block of FIG. 4A.
Figure 4A:
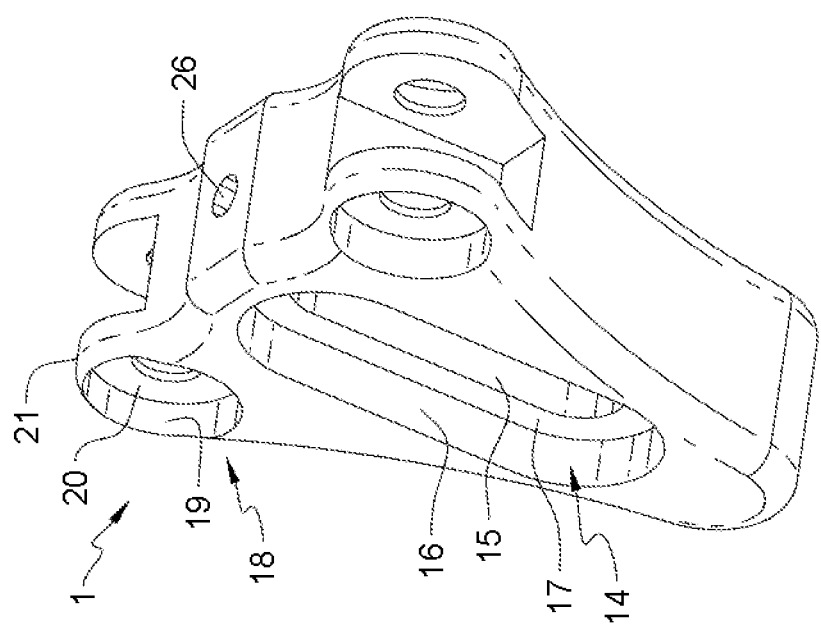
FIG. 4A is another perspective view of an axle block of the present invention from inboard side.
Figure 5B:
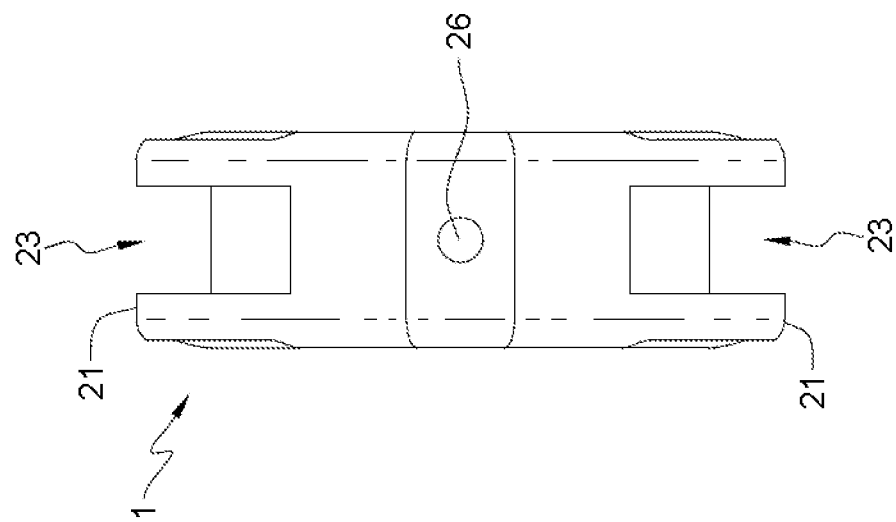
FIG. 5B is a side view of the front end of the axle block of FIG. 5A.
Figure 5A:
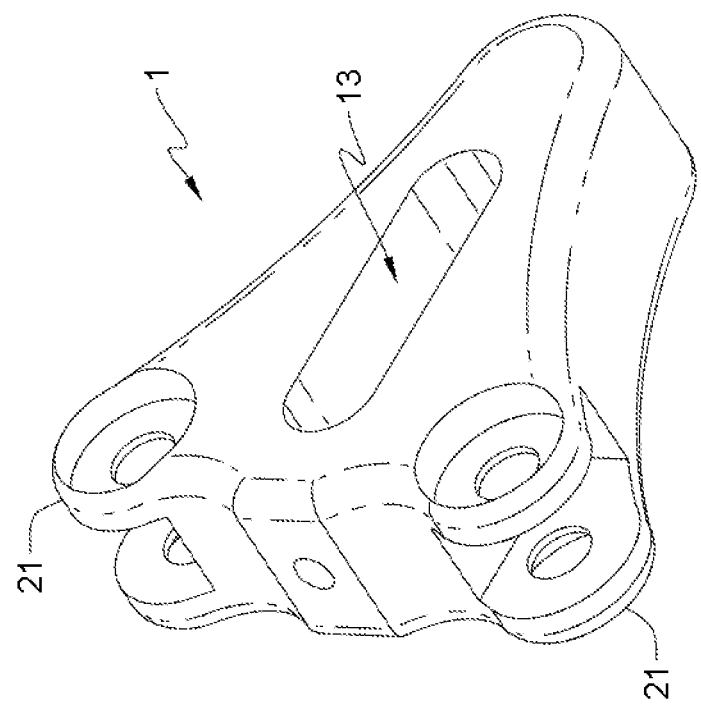
FIG. 5A is another perspective view of the axle block of FIG. 4A from outboard side.
Figure 9:
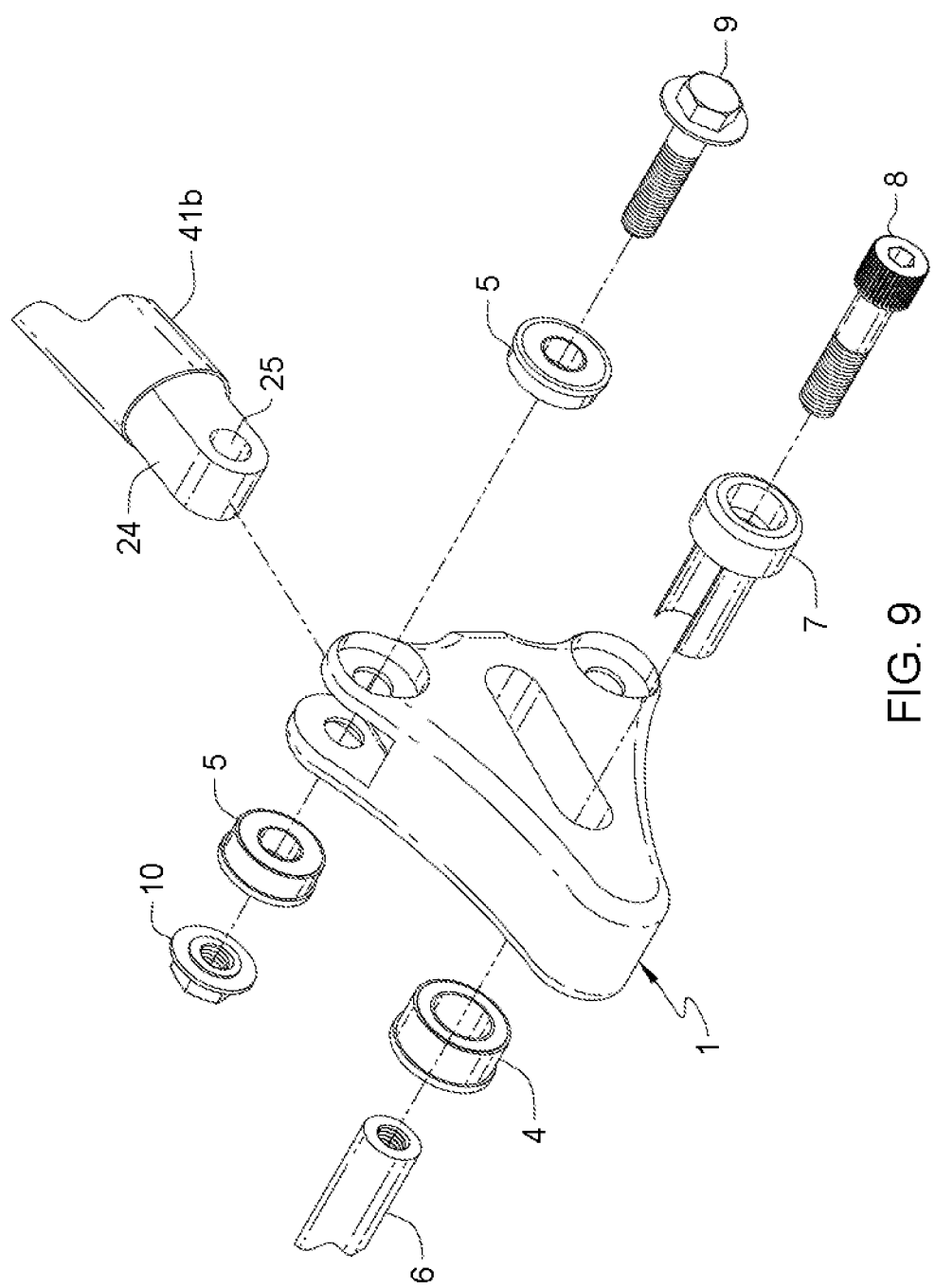
FIG. 9 is an exploded assembly view of an axle block, axle and frame member of the present invention.

With reference to FIGS. 3A, 7 and 9, in a preferred embodiment of the present invention, the inner races 4a of left and right side main bearings 4 are tightly connected to the axle by compressive preload provided by tightening left and right side axle caps 7 to axle 6, which puts into compression axle cap forks 72, inner races 4a, rear wheel hub components comprising inner races of rear wheel bearings (not shown), and left and right side spacers (not shown) disposed between the rear wheel hub and the left and right side inner races 4a. From left to right, the foregoing compression path comprises left forks 72, left inner race 4a, left spacer (not shown), inner race of rear wheel bearing (not shown), right spacer (not shown), right inner race 4a, and right forks 72.

In a preferred embodiment of the present invention, outer race 4b of the main bearing may have a press fit (i.e., an interference fit) with axle block aperture 14 so that outer race 4b and axle block surface 16 bear against one another and hold the outer race firmly in aperture 14. Inner race 4a and outer race 4b are free to rotate with respect to one another, thus providing freedom of angular rotation between the axle block and axle.

With reference to FIGS. 3A, 3B, 4A, 4B, 5A, 5B, 9 and 10, in one embodiment of the axle block 1 of the present invention, main bearing 4 may be disposed in aperture 14 on the inboard side of the axle block and lobe bearings 5 may be disposed in bearing recesses 18 in lobes 21 on both the inboard side and outboard side of the axle block.

With further reference to FIGS. 3A-5B, a preferred embodiment of the axle block 1 of the present invention comprises a body with four lobes 21 extending from the body, including an upper inboard lobe, upper outboard lobe, lower inboard lobe and lower outboard lobe. Each lobe may have a bearing recess 18 for receiving a lobe bearing 5. Lobe recess 18 may be defined by recess side wall 19 and recess bottom surface 20. The inboard and outboard lobes define spaces 23 between them for receiving a lug of an absorber or lug of a frame member. A through-hole 22 may be provided in each lobe. The upper lobe through-holes may be aligned axially with each other and the lower lobe through-holes may be aligned axially with each other. Aligned holes may cooperate to receive a pin, rod or threaded fastener. Axle block 1 may have elongated apertures 13 and 14 for receiving an axle 6 of a motorcycle rear wheel. The axle block may also be provided with a threaded bore 26 for receiving a threaded rod used to adjust the location of the rear wheel axle in the aperture in the direction of the bore.

Outer races 5b of lobe bearings 5 may have a press fit (i.e., interference fit) in recesses 18 so as to be tightly connected to the axle block, and the inner races 5a of the lobe bearings may be tightly connected to lug 24 of in-line shock absorber 41b. Outer race 5b may contact axle block surface 20. Spacers (not shown) may be disposed around the shaft of bolt 9 between inner races 5a and the sides of absorber lug 24, said spacers having an outside diameter smaller than the inside diameter of lobe through hole 22 so that they may have a clearance fit through the through hole. Said spacers (not shown) providing for a tight joint between lug 24 and inner races 5a, which joint may be tightened by threading bolt 9 and nut 10 together.

Lug 24 may have a clearance fit in space 23 between lobes 21 so that the shock absorber and axle block may freely rotate with respect to one another.

Figure 6:
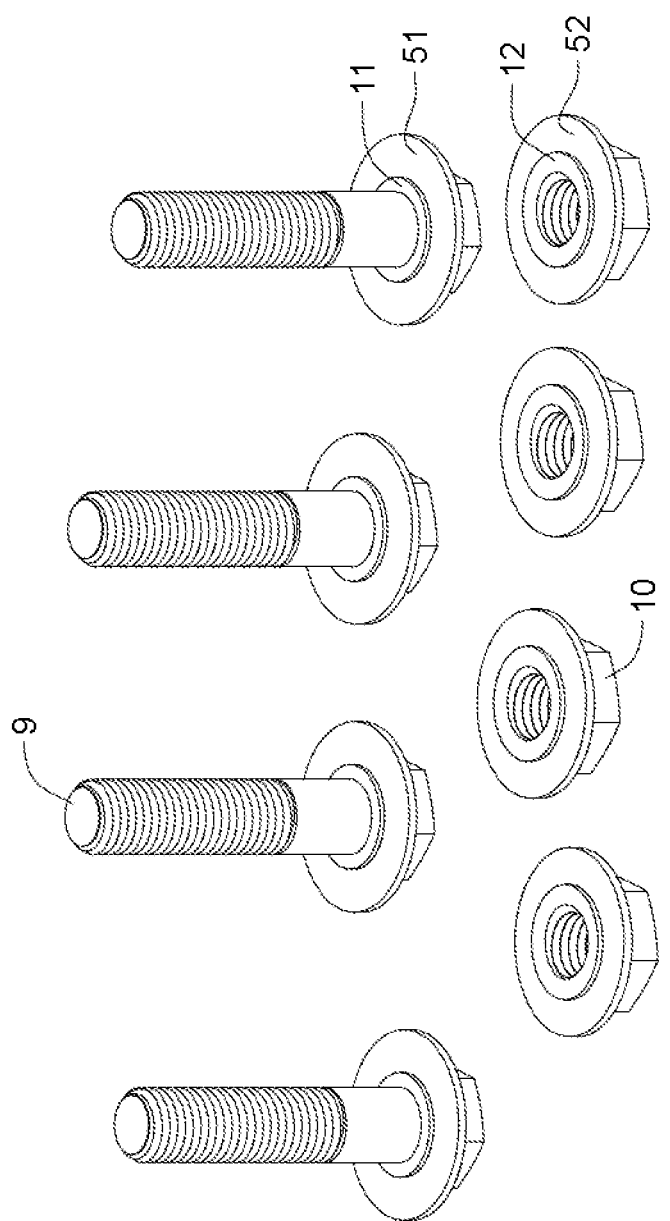
FIG. 6 is a perspective view of nuts and bolts of the present invention that connect the axle block and shock absorbers together.
Figure 8A:
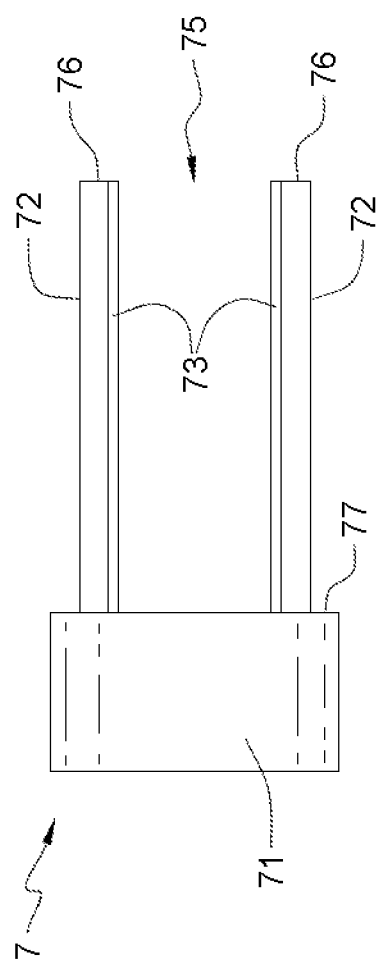
FIG. 8A is a top view of an axle cap of the present invention.
Figure 8B:
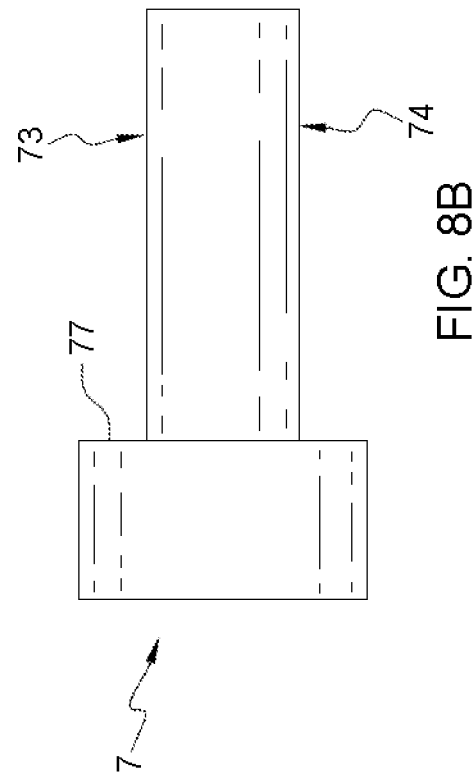
FIG. 8B is a side view of axle cap of FIG. 8A.

With reference to FIG. 6, bolts 9 may comprise a flange 51 with raised surface 11 for contacting inner race 5a of outboard-side lobe bearing 5, and nut 10 may comprise a flange 52 with raised surface 12 for contacting inner race 5a of inboard-side lobe bearing 5. Said raised surfaces provide lateral spacing so that the flanges of the nuts and bolts do not contact outer races 5b or any other part of bearings 5 so that the outer races are free to rotate relative to the inner races 5a.

The outer race of the main bearing may be tightly connected to the axle block without being connected to the rear wheel axle, and the inner race of the main bearing may be tightly connected to the rear wheel axle without being connected to the axle block so that the axle and axle block may freely rotate with respect to one another.

In another embodiment, the both the inner and outer races of the main bearing may be tightly connected to the axle block and the inner race of the main bearing may be tightly connected to the rear wheel axle so as to prevent free rotation of the axle block relative to the rear wheel axle. In this embodiment, the length of forks 72 of the axle cap may be shortened to allow contact between axle block surface 17 (see FIG. 4A) and inner race 4b (see FIG. 3A).

With reference to FIG. 3A, in one embodiment, outer race 4b of the main bearing may have a press fit with the axle block aperture to form a tight connection. Said outer race 4b may have a flange that has an outer diameter greater than the width of aperture 14 so that the flange extends laterally beyond the aperture opening. The flange may contact surface 29 of the axle block.

With reference to FIGS. 4A-5B, recess 18, through holes 22, outboard aperture 13, and inboard aperture 14 may be parallel to one another so as to align bolt 9 horizontally and parallel to axle 6 when the axle block is operatively assembled with a horizontal axle.

In a preferred embodiment, inboard aperture 14 may be wider than outboard aperture 13, thus forming shoulder surface 17. Surface 17 may contact outer race 4b of the main bearing. Inboard aperture 14 may form a guide for the main bearing and outboard aperture 13 may form a guide for rear wheel axle 6.

A lug 24 of a shock absorber or frame member (see FIG. 9) may be disposed in space 23 between opposing lobes. Lug 24 may be provided with through hole 25 for alignment with the opening of the inner race 5a and lobe through holes 22. In a preferred embodiment, the lug may have a clearance fit in the space between the lobes. Ring-shaped spacers (not shown) may be disposed on each side of the lug between the lug and inner races of the lobe bearings so as to take up some or all of the clearance between the lug and inner races. Alternatively to separate spacers, the lug may be provided with raised surfaces adjacent to the inner races.

With reference to FIGS. 6 and 9, bolt 9 may be disposed through the lobe bearings 5, lobe through-holes 22, and the lug through-hole 25 so as to connect a shock absorber to the axle block. Likewise, a frame member with a lug may be directly connected to the axle block in a case where there is no shock absorber. The head of the bolt contacts inner race 5a of the lobe bearing and a nut is threaded on the threaded end of the bolt tightly against the inner race of the lobe bearing on the opposite side of the axle block. With reference to FIG. 6, the nuts and bolts may be provided with raised surfaces 11 and 12 for contacting the inner races of the lobe bearings. A ring shaped spacer (not shown) may be disposed between the lug and the inner races. Thus a tight joint is formed between the inner races and shock absorber lug, said joint comprising the bolt, inner race of outboard lobe bearing, outboard lug spacer, lug, inboard lug spacer, inner race of inboard lobe bearing, and nut.

In an alternate embodiment, ring shaped spacers (not shown) for contacting the inner race may be disposed around the shaft of the bolt between the bolt head and inner race, and another spacer may be disposed around the bolt threads between the inner race and the nut. In a preferred embodiment, the inner races do not contact the axle block. The lobe through hole may be of larger diameter than the outer diameter of the inner race. Thus, the shock absorber and axle block are free to rotate with respect to one another and are thus rotatably connected to one another.

The improved axle block and suspension system of the present invention provides advantages over existing suspension systems. A motorcycle suspension system comprising in-line shock absorbers rotatably connected to an axle block that is rotatably connected to the rear wheel axle provides for unique and improved suspension. The system provides capacity for independent amount and direction of shock absorber deflections. For example, top and bottom shock absorbers may compress or extend by different amounts simultaneously. For further example, top shock absorbers may compress as lower absorbers extend, and may extend as lower absorbers compress.

The pivoting axle block allows each side of the rear wheel to function with separate, individual degrees of freedom. Axle blocks may pivot freely and independently of one another, which provides independent, or partially independent, suspension between the left side and right side. For example, one side may compress while the other remains at rest. The present invention allows for limited roll and yaw of the axle (i.e., rotation about an axis perpendicular to the axle).

The improved axle block and suspension system allows for shock absorbers to be mounted in both an upper and lower position. In a preferred embodiment there are two (2) absorbers per axle block, and four (4) absorbers per frame (two axle blocks per frame). Therefore, the disruptive forces causing shock or vibration may be dampened or reacted out over four shock absorbers.

In an alternate embodiment in which free rotation of an axle block relative to the rear wheel axle may be undesirable, the main bearing may be omitted and the rear wheel axle may be tightly connected directly to an axle block. In said embodiment, the aperture may be provided in uniform width, without a stepped wall.

While the invention has been particularly shown and described with reference to certain embodiments, it will be understood by those skilled in the art that various changes in form and details may be made to the invention without departing from the spirit and scope of the invention as described in the following claims.

I claim:

1. An axle block comprising:
   a body configured to receive a motorcycle rear wheel axle in a first axial alignment along a first axis;
   a first recess in the body configured to receive a first bearing;
   a first through hole in the first recess aligned on a second axis, said second axis parallel to and spaced a first distance from said first axis;
   a second recess in the body configured to receive a second bearing; and
   a second through hole in the second recess aligned on a third axis, said third axis parallel to and spaced a second distance from said first axis.

2. An axle block comprising:
   a body comprising:
      a first aperture configured to receive a horizontally disposed axle on a first axis;
      a second aperture configured to receive a first horizontally disposed bearing on a second axis, said second axis parallel to and spaced a first distance from said first axis; and
      a third aperture configured to receive a second horizontally disposed bearing on a third axis, said third axis parallel to and spaced a second distance from said first axis.

3. An axle block comprising:
   a body having an aperture for receiving a motorcycle wheel axle on a first axis;
   a first bearing connected to the body and aligned on a second axis so as to provide a pivotal connectability with a motorcycle frame on a pivot axis aligned on said second axis, said second axis spaced a first distance from said first axis; and
   a second bearing connected to the body and aligned on a third axis so as to provide a pivotal connectability with a motorcycle frame on a pivot axis aligned on said third axis, said third axis spaced a second distance from said first axis.

4. An axle block comprising:
   a body;
   a first bearing having a first inner race and a first outer race, said first inner race and first outer race concentrically aligned on a first axis;
   said first outer race connected to the body;
   said first inner race configured to receive a rear wheel axle; and
   a second bearing aligned on a second axis for connecting the axle block to a frame pivotally about a pivot axis aligned on said second axis, said second axis spaced a first distance from said first axis; and
   a third bearing aligned on a third axis for connecting the axle block to a frame pivotally about a pivot axis aligned on said third axis, said third axis spaced a second distance from said first axis.

5. A motorcycle suspension system comprising:
   an axle block configured to receive a wheel axle on a first axis;
   a first bearing connected to the axle block, said first bearing disposed a first distance from said first axis; and
   a first rear-terminal frame member connected on its axle side to said first bearing;
   a second bearing connected to the axle block, said second bearing disposed a second distance from said first axis; and
   a second rear-terminal frame member connected on its axle side to said second bearing.

6. The motorcycle suspension system of claim 5 wherein the first bearing comprises an outer race connected to the axle block.

7. The motorcycle suspension system of claim 5 wherein the first bearing comprises an inner race connected the frame member.

8. The motorcycle suspension system of claim 7 wherein the first frame member comprises a shock absorber.

9. A motorcycle suspension system comprising:
   an axle block;
   a wheel axle connected to the axle block with a first connection, said axle aligned on a first axis;
   a first frame member pivotally connected to the axle block with a second connection, said second connection being a pivoting connection having a pivot axis spaced a first distance from said first axis; and
   a second frame member pivotally connected to the axle block with a third connection, said third connection being a pivoting connection having a pivot axis spaced a second distance from said first axis.

10. The motorcycle suspension system of claim 9, wherein the wheel axle is rotatably connected to the axle block.

11. The motorcycle suspension system of claim 10, wherein the first connection comprises a first bearing.

12. The motorcycle suspension system of claim 9, wherein the second connection comprises a second bearing.

13. The motorcycle suspension system of claim 9, wherein:
   the first connection comprises a first bearing and
   the second connection comprises a second bearing.

14. The motorcycle suspension system of claim 9, wherein the first frame member comprises a shock absorber.

15. The motorcycle suspension system of claim 14, wherein the second frame member comprises a shock absorber.

16. The motorcycle suspension system of claim 9, wherein:
   the first connection comprises a first bearing;
   the second connection comprises a second bearing; and
   the third connection comprises a third bearing.

* * * * *